United States Patent
Beaubien

(10) Patent No.: US 10,244,740 B2
(45) Date of Patent: Apr. 2, 2019

(54) FLASHING FISH LURE

(71) Applicant: Barry Beaubien, Howell, MI (US)

(72) Inventor: Barry Beaubien, Howell, MI (US)

(*) Notice: Subject to any disclaimer, the term of this patent is extended or adjusted under 35 U.S.C. 154(b) by 212 days.

(21) Appl. No.: 14/305,568

(22) Filed: Jun. 16, 2014

(65) Prior Publication Data

US 2014/0373426 A1  Dec. 25, 2014

Related U.S. Application Data

(60) Provisional application No. 61/837,474, filed on Jun. 20, 2013.

(51) Int. Cl.
*A01K 85/01* (2006.01)

(52) U.S. Cl.
CPC .................................. *A01K 85/01* (2013.01)

(58) Field of Classification Search
CPC ................................ A01K 85/01; A01K 85/00
USPC .................... 43/17.5, 17.6, 113; 446/242, 219
See application file for complete search history.

(56) References Cited

U.S. PATENT DOCUMENTS

| | | | | |
|---|---|---|---|---|
| 1,426,283 A | * | 8/1922 | Ewert | ..................... A01K 85/16 43/42.13 |
| 2,002,135 A | * | 5/1935 | Barton | ................... A01K 85/01 200/60 |
| 2,534,639 A | | 12/1950 | Twist | |
| 2,999,329 A | | 9/1961 | Pankuch | |
| 3,449,852 A | | 6/1969 | Mitchell | |
| 3,728,811 A | | 4/1973 | Weimer | |
| 4,098,017 A | | 7/1978 | Hall | |
| 4,227,331 A | | 10/1980 | Ursrey et al. | |
| 4,610,103 A | * | 9/1986 | Steinman | ............... A01K 85/01 43/17.6 |
| 4,777,756 A | * | 10/1988 | Mattison | ................ A01K 85/01 43/17.6 |
| 4,831,767 A | | 5/1989 | Pearce | |
| 4,903,428 A | * | 2/1990 | Sluiter | ................. A01K 91/065 43/26.1 |
| 6,029,388 A | * | 2/2000 | Yokogawa | ............ A01K 85/01 43/17.5 |
| 6,427,375 B1 | | 8/2002 | Hair, III et al. | |
| 2006/0288633 A1 | * | 12/2006 | Fiferlick | ............... A01K 93/00 43/44.92 |

(Continued)

FOREIGN PATENT DOCUMENTS

WO  WO 9310660 A1 * 6/1993 ............. A01K 85/00

*Primary Examiner* — Peter M Poon
*Assistant Examiner* — Jeffrey R Larsen
(74) *Attorney, Agent, or Firm* — Dinsmore & Shohl LLP

(57) ABSTRACT

A flashing fish lure includes a bore to receive a glow stick. At least one water wheel on or in the body rotates as the body is pulled through water. Each water wheel includes at least one aperture, such that as the water wheel rotates, light is intermittently communicated from the glow stick, through the aperture, and out or both of the opposing side surfaces to appear as a flashing light. The glow stick may use a chemiluminescent or phosphorescent material. An end of the glow stick may remain exposed following insertion, and a decorative skirt or other fish-attracting material may be attached to the exposed end of the glow stick. Two water wheels may be supported on respective opposing sides of the body, each with a plurality of water-catching vanes extending radially outwardly from a central axis about which each wheel rotates.

21 Claims, 5 Drawing Sheets

(56) References Cited

U.S. PATENT DOCUMENTS

| | | | |
|---|---|---|---|
| 2007/0062094 A1* | 3/2007 | Senter | A01K 85/00 43/17.6 |
| 2011/0058352 A1* | 3/2011 | Ashby | G09F 13/20 362/34 |
| 2011/0277370 A1 | 11/2011 | McManigal | |
| 2013/0036654 A1 | 2/2013 | Goosey | |

* cited by examiner

FLASHING FISH LURE

REFERENCE TO RELATED APPLICATION

This application claims priority from U.S. Provisional Patent Application Ser. No. 61/837,474, filed Jun. 20, 2013, the entire content of which is incorporated herein by reference.

FIELD OF THE INVENTION

This invention relates generally to fishing lure and, in particular, to a lure that includes a glow stick that flashes light through one or more rotating water wheels.

BACKGROUND OF THE INVENTION

There are numerous fishing lure designs with goal always being to attract and catch fish. Some lures use flashing light(s). As one example, U.S. Pat. No. 4,227,331 describes a fishing lure which uses one or more light emitting diodes (LEDs), preferably of a type which emit green light, attached to and protruding outwardly from the lure body so as to provide wide angle dispersion of light. The lure further includes a suitable power source disposed internally of the lure body for energizing and flashing the LED. One of the problems with such designs is that the necessary electronics raises costs and operation may be sub-optimal in cold water.

Other light-emitting lures make use of chemi-luminescent "glow sticks." Published U.S. Application No. 2011/0277370 discloses a variable light fishing lure comprised of a plastic housing with an internal cavity for holding a submergible lighted element and an angled aperture for inserting the lighted element such as a glow stick into the cavity. A plug is inserted into the angled aperture to prevent the lighted element from falling out of the housing. Water can be added to plastic housing before inserting the plug to adjust the buoyancy of the fishing lure. The outside of the plastic housing contains a striated pattern which allows light from the lighted element to shine through the housing. The lighted element can be easily removed from the housing and replaced with the same or another color lighted element.

There are also lures that include internal water wheels to make noise. As a different example, U.S. Pat. No. 2,999,329 includes a main body member having a rectangular shaped vertical passageway. A shaft extends across the cavity and is rotatably supported within recesses extending horizontally across the lure and intersecting the cavity. A ratchet wheel is secured to the rotatable shaft at the upper end of the cavity. A plurality of arcuate vanes extend on each side of the lure and serve as a pressure responsive means for effecting rotation of the shaft and ratchet wheel as the lure is drawn through the water. A reed is secured at one end of the main body and has its opposite end extending into the cavity for frictional engagement with the teeth of the ratchet wheel. As the fishing lure is drawn through the water, the vanes effect rotation of the shaft and the ratchet wheel so that an audible signal is emitted in the form of vibrations that travel through the water to attract fish thereto. To best simulate vibrations of various live insects, rodents, aquatic animals and other natural live foods of fish, the vibrations are not continuously provided.

SUMMARY OF THE INVENTION

This invention is directed to a flashing fish lure. The lure comprises a body having front, rear, top and bottom portion and opposing side surfaces. A bore is formed in the body to receive a glow stick. At least one water wheel on or in the body rotates about a side-to-side axis as the body is pulled through water. Each water wheel includes at least one aperture, such that as the water wheel rotates, light is intermittently communicated from the glow stick, through the aperture, and out or both of the opposing side surfaces to appear as a flashing light.

In the preferred embodiments, the bore is formed diagonally upwardly from a rear bottom portion toward a front top portion of the body. The glow stick may use a single-use chemiluminescent material or a rechargeable phosphorescent material. The glow stick may be held in place with a frictional fit, screw threads, or inserted/released through an axially oriented clicking action akin to that of a retractable ball-point pen. An end of the glow stick may remain exposed following insertion, and a decorative skirt or other fish-attracting material may be attached to the exposed end of the glow stick.

The preferred embodiment includes two water wheels supported on respective opposing sides of the body. Each water wheel includes a plurality of vanes extending radially outwardly from a central axis about which each wheel rotates. The vanes of each water wheel may be straight or curved to enhance rotation. The sides of the body may be shaped to increase the exposure of the water wheels water flowing past the body as it moves through water. The axes of the water wheels may be independently angled to increase the exposure of the water wheels water flowing past the body as it moves through water.

The lure may include at least one additional aperture through the body to the glow stick once in position so as to create a localized region that glows continuously while the glow stick emits light. Such an additional aperture may be located at the top front portion of the body. If the body is painted with a thin layer of paint, light from the additional aperture may travel through the thin layer of paint. Some or all of the apertures through the body may be hollow or potted with a light conductive material. As with other lures, one or more fish hooks may be attached to the bottom or rear portions of the body. The body, which may be fish-shaped, may further include an angled, movement-controlling bill plate connected to the front portion thereof.

DETAILED DESCRIPTION OF THE INVENTION

This invention improves upon the existing art by providing non-electrified, glowing fish lures that nevertheless flash under water and, in some embodiments, emit sound.

Figure 1:
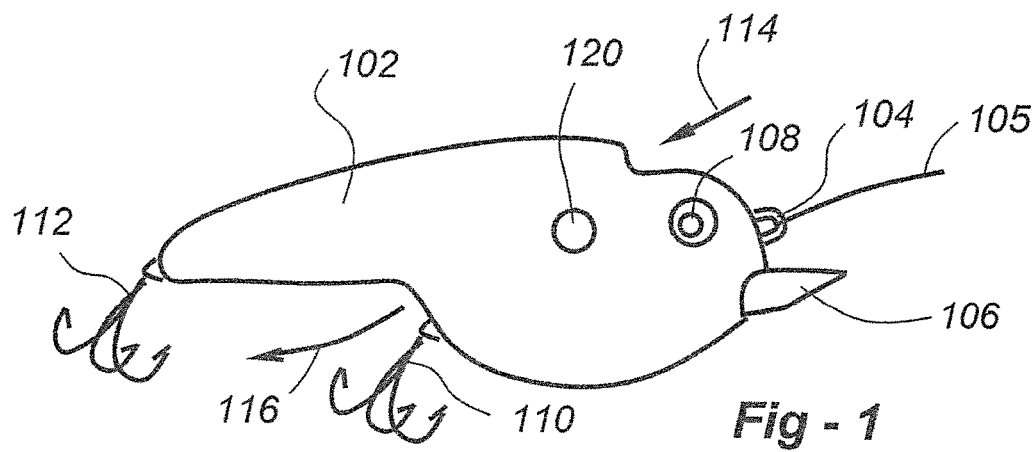
FIG. 1 illustrates one embodiment of the invention.

FIG. 1 illustrates one embodiment of the invention. The lure includes a body 102 with a line grommet 104, and one or more hooks such as treble hooks 110, 112. An aperture 120, preferably on both sides of the lure, extends into an internal cavity described below. The aperture may be a hollow bore or may include light-transmissive material. The lure optionally includes a member 106 to induce a desired underwater motion and/or decorative features such as eye 108.

In contrast to existing designs, the lure has a forward port that receives flowing water 114 and a rearward port that expels the water such that the water flows through the lure as it travels under water. Although the forward port is shown at the top of the lure and the rearward port is depicted at the bottom of the lure other placements are possible so long as a flow-through is achieved.

Figure 2:
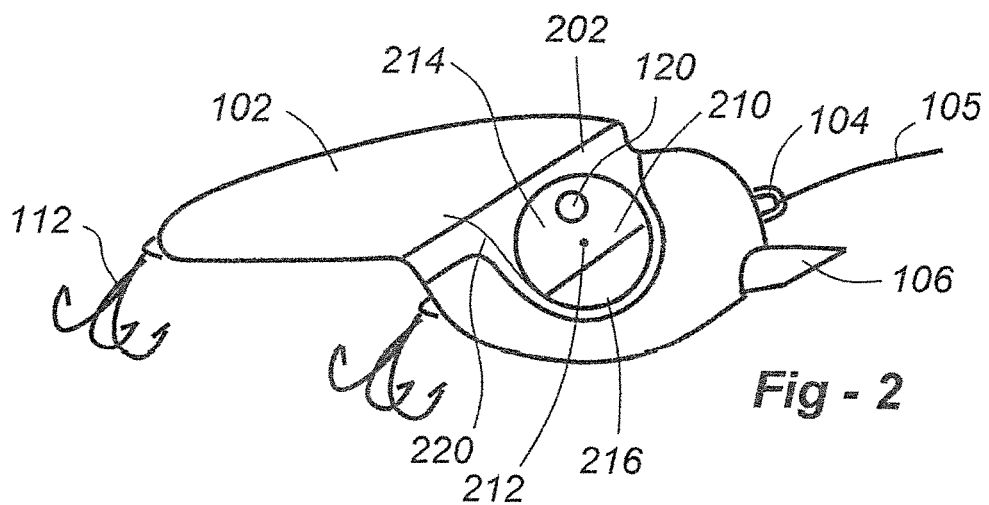
FIG. 2 shows the lure of FIG. 1 in partial cross section.

FIG. 2 shows the lure of FIG. 1 in partial cross-section. A cavity 202 within the body forms a water-flow path and also serves to accommodate water wheel 210 which rotates about axis 212 during use. On both sides of the wheel there is provided a luminescent portion 216 and a non-luminescent portion 214. The luminescent portion 216 may be implemented with a photoluminescent paint, whereas the non-luminescent portion 214 may be a color such as flat black.

The aperture in the removed portion of the lure is depicted in broken line form in FIG. 2. In operation, the luminescent portions on both sides of the wheel are charged with light, be it sunlight or light from a source such as a flash, LED flashlight, etc. As water flows through the lure as shown in FIG. 1, the luminescent portion 216 may be seen through aperture 120, but only on an intermittent basis, thereby causing a spot on the side of the lure to appear to flash the glowing material on the water wheel 210. As an added optional attraction, the lure may include a spring member 220 urged against the vanes of the water wheel to emit a clicking sound as the wheel rotates.

Figure 3:
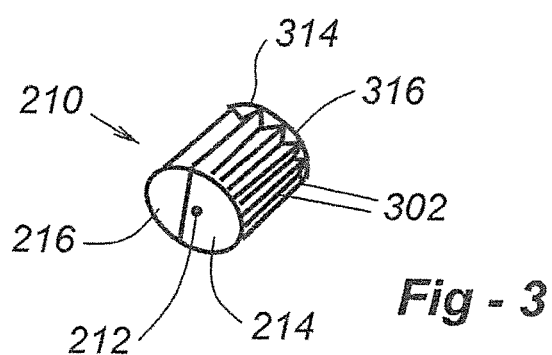
FIG. 3 is an oblique drawing of a water wheel.

FIG. 3 is an oblique drawing of the water wheel 210. Vanes 302 are provided between opposing plates containing the luminescent and non-luminescent portions 214, 216. The luminescent and non-luminescent portions 214, 216 need not match on the two sides of the lure; that is, a flash may be occurring on one side while the other side is dark, and vice-versa.

Figure 4:
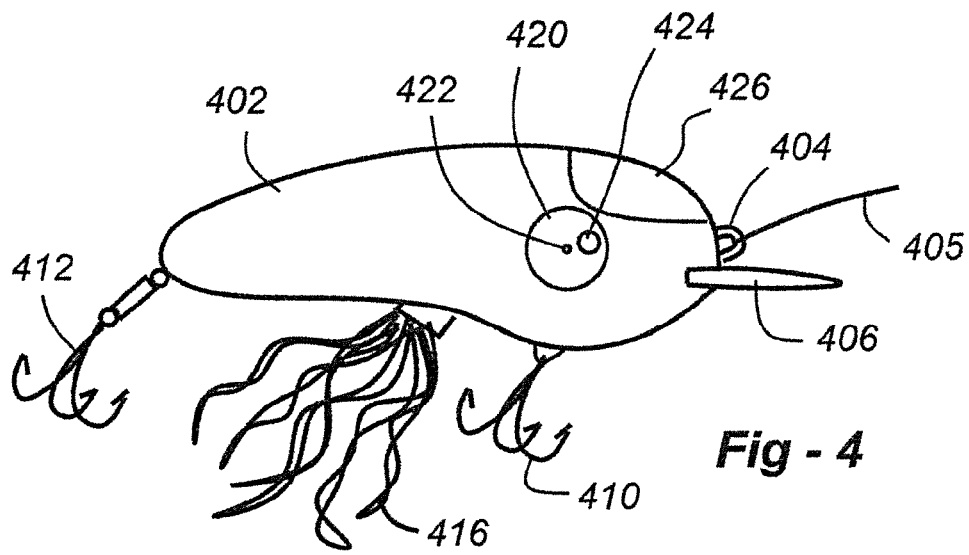
FIG. 4 is an alternative embodiment of the invention that uses a small glow stick.

FIG. 4 is an alternative embodiment of the invention which uses a small glow stick (510). Again, the lure includes a body 402 with a line grommet 404, and one or more hooks such as treble hooks 412, 416. In this case external water wheels 420, preferably on both sides of the lure, are rotatable about an axis (422), and each includes an aperture 424 that extends into an internal cavity described below. The aperture may be a hollow bore or may include light-transmissive material. The lure optionally includes a member 106 to induce a desired underwater motion and/or decorative features.

Figure 5:
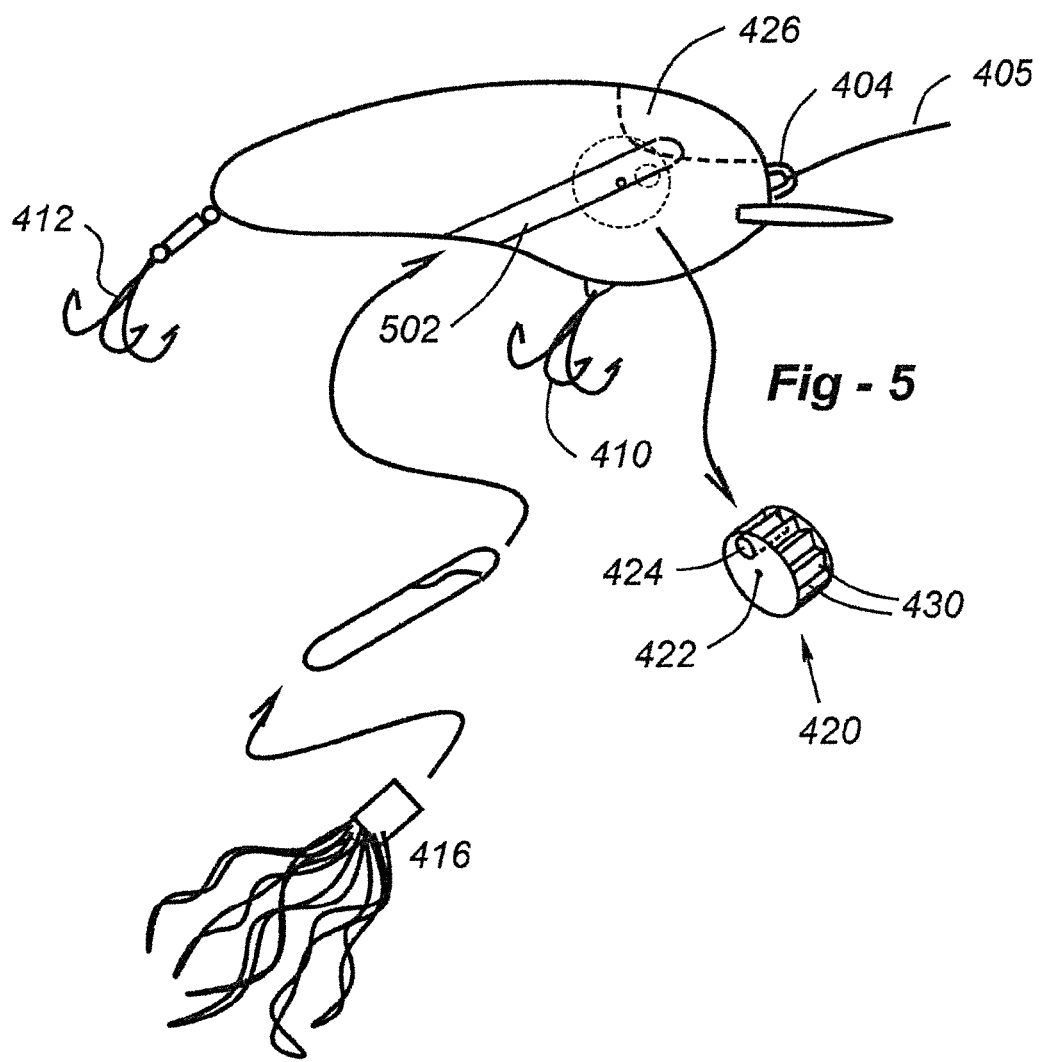
FIG. 5 shows a water wheel on the outside of a lure body.

FIG. 5 is a partial cross section of a lure showing an internal cavity 502 that receives the glow stick 510. Once inserted, a decorative tailpiece 416 may be fitted onto the end of the stick 510. As seen in the oblique rendition of the water wheel 420, vanes 430 are provided between opposing plates to spin the wheel about axis 422 on the outside of the lure body 402. The aperture extending through the wheel 420 is depicted at 424.

In operation, the glow stick is manipulated to initiate the chemiluminescent glowing process, inserted into the cavity 502, and decorative piece added, if provided. As water flows over the lure, the glow may be seen through aperture 424 in each external wheel 420, but only on an intermittent basis, thereby causing a spot on the side of the lure to appear to flash the glowing material. For added attraction, the lure may include a light-transmissive portion 426 that emits light from glow stick 510 on a continuous basis.

Figure 6A:
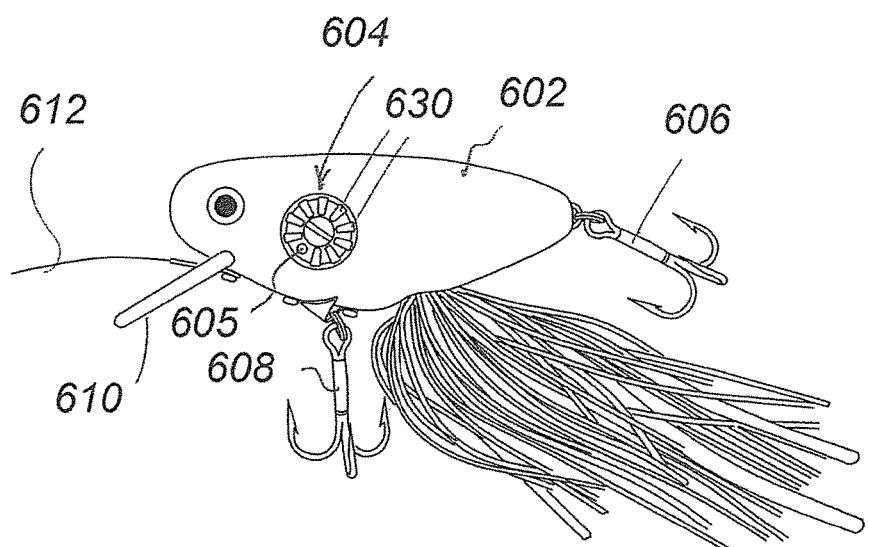
FIGS. 6A-6E illustrate embodiments of the invention that use water wheels 604 disposed on opposing outer sides of a lure body.
Figure 6B:
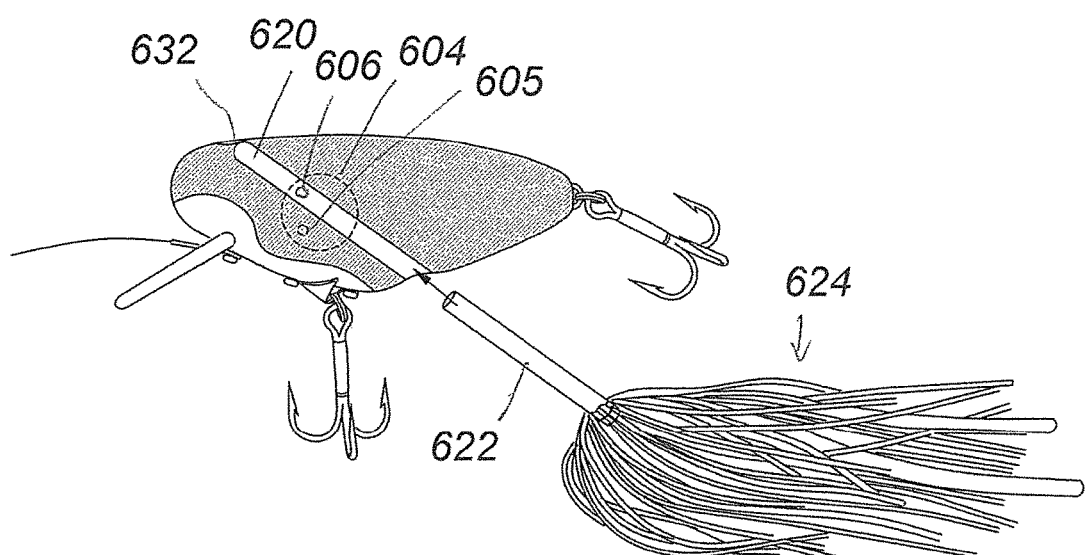
Figure 6C:
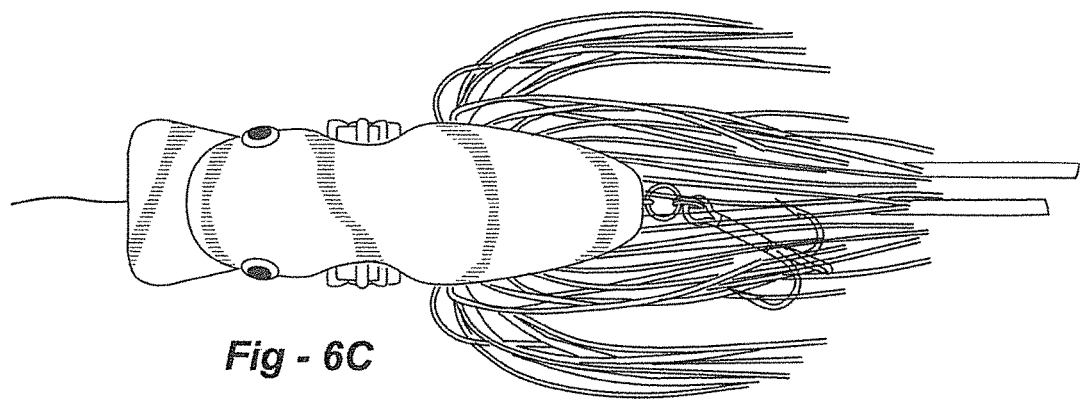
Figure 6D:
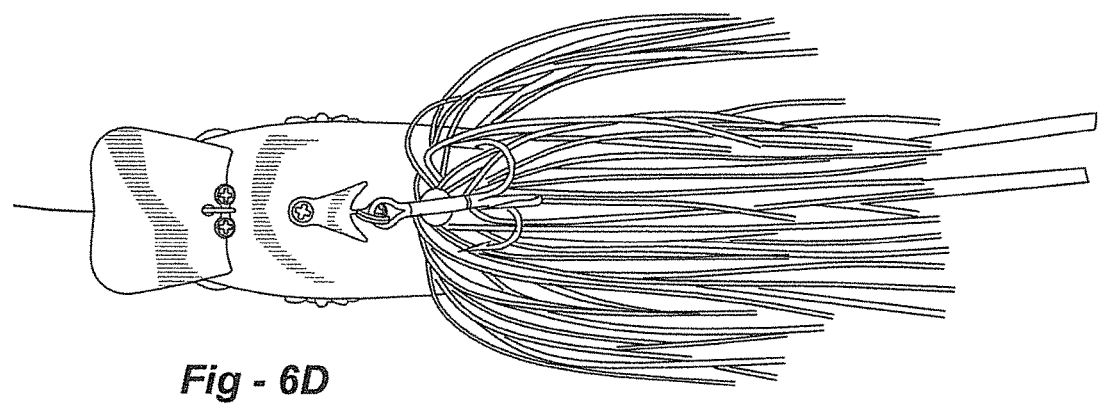
Figure 6E:
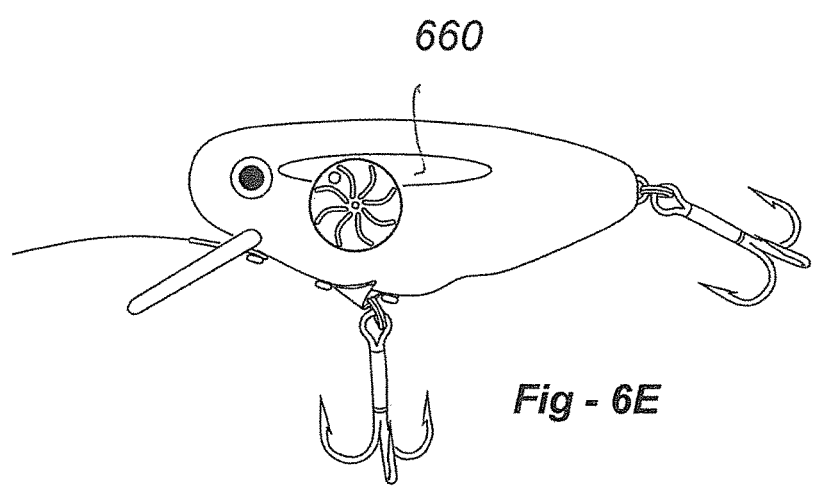
Figure 7:
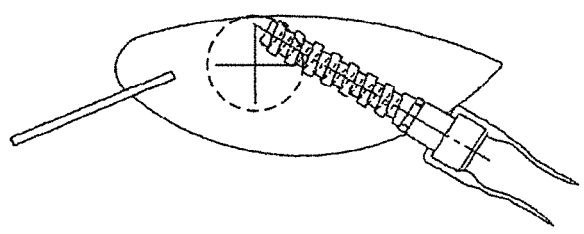
FIG. 7 shows how the glow stick and lure body may have screw threads using a screwdriver or other tool for insertion.

FIGS. 6A-6E illustrate embodiments of the invention that use water wheels 604 disposed on opposing outer sides of a lure body 602. As with other lures, the body 602 may be fish-shaped, including hooks 606, 608. A front bill 610 may be included to control movement in the water as the lure is pulled by line 612. FIG. 6B is a partial cross section of the lure of FIG. 6A. A bore 620 is formed in the body, preferably from a lower portion of the body to an upper frontal surface on a diagonal. The bore 620 is configured to receive a glow stick 622, which may use a single-use chemiluminescent material or a rechargeable phosphorescent material. The glow stick 622 may be held in place with a frictional fit, or inserted/released through an axially oriented clicking action akin to that of a retractable ball-point pen. Alternatively, as shown in FIG. 7, the glow stick and lure body may have screw threads using a screwdriver or other tool for insertion. An end of the glow stick may remain exposed following insertion, and a decorative skirt 624 or other fish-attracting material may be attached to the exposed end of the glow stick.

In FIG. 6B, the broken lines show the water wheel that was removed, which included at least one aperture 605. As the wheel rotates as the lure is pulled through the water, the apertures of the wheel align with one or more apertures 626 through the body, causing the light from the glow stick 622 to be visible through the sides of the lure in flashing fashion. An optional aperture 632 may be provided on the top of the lure, for example, so as to create a localized region that glows continuously while the glow stick emits light. Such an additional aperture may be located at the top front portion of the body. If the body is painted with a thin layer of paint, light from the additional aperture may travel through the thin layer of paint. Some or all of the apertures through the body may be hollow or potted with a light conductive material.

Each water wheel 604 includes a plurality of vanes 630 extending radially outwardly from a central axis about which each wheel rotates. The vanes of each water wheel may be straight or curved as shown in FIG. 6E to enhance rotation. The sides of the body may be shaped to increase the exposure of the water wheels water flowing past the body as it moves through water. For example, as also shown in FIG. 6E, the body may include longitudinal cut-outs to direct water toward the vanes of each wheel. The axes of the water wheels further may be independently angled, as evident by comparing FIGS. 6C and 6D to increase the exposure of the water wheels water flowing past the body as it moves through water.

The invention claimed is:

1. A flashing fish lure, comprising:
  a body having front, rear, top and bottom portions and two opposing side surfaces;
  a bore formed in the body;
  a glow stick insertable into the bore;
  at least one water wheel on or in the body, the water wheel being rotatable about a side-to-side axis as the body is pulled through water, the side-to-side axis being transverse to a direction the body is pulled;
  each water wheel including at least one light-transmissive aperture extending therethrough and structurally aligned with the bore at a point in rotation about the side-to-side axis, such that as the at least one water wheel rotates about the side-to-side axis, light is intermittently communicated from the glow stick, through the at least one aperture, and out one or both of the two opposing side surfaces to appear as an intermittently radiated light.

2. The flashing fish lure of claim 1, wherein the bore is formed diagonally upwardly from a rear bottom portion toward a front top portion of the body.

3. The flashing fish lure of claim 1, wherein the glow stick uses a single-use chemiluminescent material or a rechargeable phosphorescent material.

4. The flashing fish lure of claim 1, wherein the glow stick is held in place with a frictional fit or is inserted or released through an axially oriented clicking action.

5. The flashing fish lure of claim 1, wherein:
an end of the glow stick remains exposed following insertion; and
further including a decorative skirt or other fish-attracting material attached to the exposed end of the glow stick.

6. The flashing fish lure of claim 1, including two water wheels supported on respective ones of the two opposing side surfaces of the body.

7. The flashing fish lure of claim 6, wherein each water wheel includes a plurality of vanes extending radially outwardly from a central axis about which each wheel rotates.

8. The flashing fish lure of claim 6, wherein the vanes of each water wheel are straight or curved to enhance rotation.

9. The flashing fish lure of claim 6, wherein the side surfaces of the body are shaped to increase exposure of the water wheels to water flowing past the body as it moves through water.

10. The flashing fish lure of claim 6, wherein the axes of the water wheels are independently angled to increase exposure of the water wheels to water flowing past the body as it moves through water.

11. The flashing fish lure of claim 1, further including at least one additional aperture through the body to the glow stick once in position so as to create a localized region that glows continuously while the glow stick emits light.

12. The flashing fish lure of claim 11, wherein the at least one additional aperture is at a top front portion of the body.

13. The flashing fish lure of claim 11, wherein:
the body is painted with a thin layer of paint; and
light from the additional aperture is emitted through the thin layer of paint.

14. The flashing fish lure of claim 11, wherein some or all of the apertures are hollow or potted with a light conductive material.

15. The flashing fish lure of claim 1, further including one or more fish hooks attached to the bottom or rear portions of the body.

16. The flashing fish lure of claim 1, further including an angled, movement-controlling bill plate connected to the front portion of the body.

17. The flashing fish lure of claim 1, wherein the body is fish-shaped.

18. A flashing fish lure, comprising:
a body having front, rear, top and bottom portions and two opposing side surfaces;
a bore formed in the body formed diagonally upwardly from a rear bottom portion toward a front top portion of the body;
a chemiluminescent or phosphorescent glow stick insertable into the bore;
a pair of water wheels supported respectively on the two opposing side surfaces of the body, each water wheel including a plurality of straight or curved vanes extending radially outwardly from a central axis about which each wheel rotates as the body is pulled through water;
each water wheel further including at least one light-transmissive aperture, each aperture being structurally aligned with the bore at a point in rotation about the central axis, such that as the water wheel rotates about the central axis, light is intermittently communicated from the glow stick, through each aperture, and out of the two opposing side surfaces of the body to appear as intermittently radiated light; and
wherein the body is shaped or the water wheels are angled to increase exposure of the water wheels to water flowing past the body as it moves through water.

19. The flashing fish lure of claim 18, further including at least one additional aperture through the front top portion of the body to the glow stick once in position so as to create a localized region that glows continuously while the glow stick emits light.

20. The flashing fish lure of claim 18, wherein:
the body is fish-shaped; and
further including one or more fish hooks attached to the bottom or rear portions of the body; and
an angled, movement-controlling bill plate connected to the front portion of the body.

21. The flashing fish lure of claim 1, wherein the glow stick is threaded and screws into the body.

* * * * *